(12) United States Patent
Bellows et al.

(10) Patent No.: US 7,840,744 B2
(45) Date of Patent: Nov. 23, 2010

(54) RANK SELECT OPERATION BETWEEN AN XIO INTERFACE AND A DOUBLE DATA RATE INTERFACE

(75) Inventors: Mark David Bellows, Rochester, MN (US); Kent Harold Haselhorst, Byron, MN (US); John David Irish, Rochester, MN (US); David Alan Norgaard, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 657 days.

(21) Appl. No.: 11/668,725

(22) Filed: Jan. 30, 2007

(65) Prior Publication Data

US 2008/0183985 A1    Jul. 31, 2008

(51) Int. Cl.
*G06F 12/00* (2006.01)

(52) U.S. Cl. .......................... 711/5; 711/200; 711/220; 711/E12.002

(58) Field of Classification Search ............. 711/5
See application file for complete search history.

(56) References Cited

U.S. PATENT DOCUMENTS 6,961,281 B2 * 11/2005 Wong et al. ............ 365/230.03
2007/0192563 A1 * 8/2007 Rajan et al. ................ 711/202

* cited by examiner

*Primary Examiner*—Reginald G Bragdon
*Assistant Examiner*—Larry T Mackall
(74) *Attorney, Agent, or Firm*—Dugan & Dugan, PC; James R. Nock (57) ABSTRACT

In an aspect, a first method of interfacing a processor and memory is provided. The first method includes the steps of (1) generating a first command and associated address of a first type that does not indicate a rank of memory targeted by the first command; (2) determining whether the memory includes a plurality of ranks; (3) if the memory includes a plurality of ranks, employing the processor to update the address associated with the first command to indicate a memory rank targeted by the first command; (4) if the memory does not include a plurality of ranks, employing the processor to update the address associated with the first command to indicate the memory does not include a plurality of ranks; and (5) converting the first command and associated updated address to a second command and associated address that are employed to access the memory. Numerous other aspects are provided.

18 Claims, 3 Drawing Sheets

RANK SELECT OPERATION BETWEEN AN XIO INTERFACE AND A DOUBLE DATA RATE INTERFACE

FIELD OF THE INVENTION

The present invention relates generally to computer systems, and more particularly to methods and apparatus for interfacing a processor and a memory.

BACKGROUND

A first conventional computer system may include a processor coupled to a double data rate (DDR) memory (e.g., SDRAM) via a memory interface, such as a DDR link. DDR memory is cheaper than other memory, such as an extreme data rate (XDR) memory, and/or has a higher storage capacity than such other memory. More specifically, XDR memory is limited in the amount of memory capacity it may support and is more expensive than DDR 2 or DDR 3 memory. Further, DDR memory may include a plurality of ranks, and therefore, the first conventional computer system may support a DDR command and associated address from the processor that indicates a rank of the memory which includes the address. By including rank information in a DDR command, the DDR command may address at least twice as many addresses as a similar command that does not include rank information. However, the DDR link may be slower than other links (e.g., an extreme input/output (XIO) link). A width of the DDR link may be increased (e.g., to 288 bits) to increase the bandwidth thereof. Therefore, the DDR link may consume a large number of processor pins to couple to the processor. By requiring the processor to include a large number of pins, the DDR link may cause an increase in size of the processor and cost associated therewith.

A second conventional computer system may include a processor coupled to an XDR memory via a memory interface, such as an XIO link. As described above, XDR memory is more expensive and has less storage capacity than DDR memory. Further, the XDR memory may not be divided into ranks, and therefore, the second conventional computer system cannot support an XDR memory command and associated address that indicates a rank of memory including the address. However, the XIO link may be a fast, narrow link (e.g., 72 bits wide). Therefore, the XIO link may consume fewer pins on a processor to couple thereto than the DDR link. Consequently, the XIO link may enable a size of the processor and cost associated therewith to be reduced.

As described above, the DDR link coupled to the processor of the first conventional computer system may cause an increase in the size of the processor and cost associated therewith. Further, the XDR memory included in the second conventional computer system may be more expensive than other memory, may have less storage capacity than such other memory and cannot include a plurality of ranks. Accordingly, improved methods, apparatus and systems for interfacing a memory and a processor are desired.

SUMMARY OF THE INVENTION

In a first aspect of the invention, a first method of interfacing a processor and memory is provided. The first method includes the steps of (1) generating a first command and associated address of a first type that does not indicate a rank of memory targeted by the first command; (2) determining whether the memory includes a plurality of ranks; (3) if the memory includes a plurality of ranks, employing the processor to update the address associated with the first command to indicate a memory rank targeted by the first command; (4) if the memory does not include a plurality of ranks, employing the processor to update the address associated with the first command to indicate the memory does not include a plurality of ranks; and (5) converting the first command and associated updated address to a second command and associated address that are employed to access the memory.

In a second aspect of the invention, a first apparatus for interfacing a processor and memory of a computer system is provided. The first apparatus includes (1) a processor adapted to generate a first command and an associated address of a first type that does not indicate a memory rank targeted by the first command; and (2) a translation chip adapted to couple to the processor and a memory accessible by a second command and an associated address of a second type. The apparatus is adapted to (a) employ the processor to (i) generate the first command and associated address of the first type that does not indicate a rank of memory targeted by the first command; (ii) determine whether the memory includes a plurality of ranks; (iii) if the memory includes a plurality of ranks, update the address associated with the first command to indicate a memory rank targeted by the first command; and (iv) if the memory does not include a plurality of ranks, update the address associated with the first command to indicate the memory does not include a plurality of ranks; and (b) employ the translation chip to convert the first command and associated updated address to a second command and an associated address that are employed to access the memory.

In a third aspect of the invention, a first system for interfacing a processor and memory is provided. The first system includes (1) a processor adapted to generate a first command and an associated address of a first type that does not indicate a memory rank targeted by the first command; (2) a memory accessible by a second command and an associated address of a second type; and (3) a translation chip adapted to couple to the processor and the memory. The system is adapted to (a) employ the processor to (i) generate the first command and associated address of the first type that does not indicate a rank of memory targeted by the first command; (ii) determine whether the memory includes a plurality of ranks; (iii) if the memory includes a plurality of ranks, update the address associated with the first command to indicate a memory rank targeted by the first command; and (iv) if the memory does not include a plurality of ranks, update the address associated with the first command to indicate the memory does not include a plurality of ranks; and (b) employ the translation chip to convert the first command and associated updated address to a second command and associated address that are employed to access the memory. Numerous other aspects are provided in accordance with these and other aspects of the invention.

Other features and aspects of the present invention will become more fully apparent from the following detailed description, the appended claims and the accompanying drawings.

DETAILED DESCRIPTION

The present invention provides improved methods, apparatus and systems for interfacing a memory and a processor. For example, the present invention may provide a translation chip that couples a processor to a DDR memory (e.g., SDRAM) of a computer system. More specifically, the computer system may include an XIO link that couples the processor to the translation chip. Further, the computer system may include a DDR link that couples the translation chip to the DDR memory. The translation chip may be adapted to convert a command of a first type (e.g., an XDR memory command) issued by the processor to a command of a second type (e.g., a DDR memory command) which may be received by the DDR memory. By coupling an XIO link to the processor, the present methods, apparatus and systems may reduce a size of the processor and cost associated therewith. Further, by employing DDR memory, the present methods, apparatus and systems may employ an inexpensive memory having a high storage capacity (compared to other types of memory).

The memory of the present invention may include a plurality of ranks. Further, the present invention may support an XDR processor command to the memory. The processor command may be associated with an address that indicates a memory rank including the address. For example, the processor of the present invention may include logic (e.g., a register) adapted to store at least one bit indicating whether the system operates in a mode that supports memory including a plurality of ranks, and therefore, operates in a mode in which each address associated with a processor command indicates a rank including the address.

If the system operates in a first mode that does not support memory including a plurality of ranks, each command of the first type (e.g., each XDR command) issued by the processor may include a predetermined value (e.g., a logic "0") in one or more predetermined bit positions of an address associated with the command. The translation chip may receive such command of the first type and associated address and convert them to a command of the second type (e.g., a DDR command) and associated address that does not select a rank. The translation chip may transmit the DDR command and associated address to the DDR memory such that the operation specified by the DDR command may be performed on the memory.

Alternatively, if the system operates in a second mode that does support memory including a plurality of ranks, an address associated with each processor command of the first type may include one or more rank bits which indicate a rank of the memory including the address on which the command is to be performed. One or more address bit positions (e.g., bit position 31) of an address associated with the command of the first type issued by the processor may be employed to store one or more rank bits (although one or more different bit positions of an address associated with the command of the first type may be employed). For example, if the rank bit associated with the command of the first type is a logic "0", the command selects rank 0 of the DDR memory. Upon receiving such command, the translation chip may convert the command of the first type associated with a rank bit to a command of the second type associated with the rank bit. Alternatively, if the rank bit of the command of the first type is a logic "1", the command selects rank 1 of the memory. Upon receiving such command, the translation chip may convert the command of the first type associated with a rank bit to a command of the second type associated with the rank bit. The position of the rank bit in an address associated with the command of the second type may be different than the position of the rank bit in the address associated with the command of the first type. In either case, the translation chip may transmit the command of the second type on the DDR link such that the command may be performed on the memory.

The processor may be adapted to determine whether the system operates in a mode that supports memory including a plurality of ranks (e.g., by accessing a bit stored in a register). The processor is further adapted to include a predetermined logic value in one or more predetermined bit positions of an address associated with a processor command depending on the operational mode of the system. For example, if the system operates in the first mode, the processor may include a predetermined value logic (e.g., "0") in bit position 31 of an address associated with the command of the first type. Alternatively, if the system operates in the second mode, the processor may include a logic value in bit position 31 of an address associated with the command of the first type that indicates a rank of the memory on which the command is to be performed.

Switching from accessing a first memory rank to accessing a second memory rank may require time. Therefore, when a first command requires access to a first rank of a memory, and shortly thereafter, a second command requires access to a second rank of the memory, the second XDR command may be delayed to ensure the first memory rank access by the first command completes. The processor of the present invention includes logic to delay commands in this manner.

In this manner, the present invention provides improved methods, apparatus and systems for interfacing a memory and processor. More specifically, the present invention may employ a processor to modify an address associated with a command such that the modified address includes one or more bits indicating a DDR memory rank that includes the address on which the command is to be performed, and transmit such XDR command and modified address associated therewith to a translation chip. The translation chip may convert the XDR command and modified address associated therewith to a DDR command and an address associated therewith. The DDR command address may include one or more bits indicating the DDR memory rank that includes the address on which the command is to be performed, and transmit such DDR command on the second link to the DDR memory such that the command may be performed thereon. Thus, the present invention may provide a rank select operation between an XIO interface and a DDR2 interface of a system.

Figure 1:
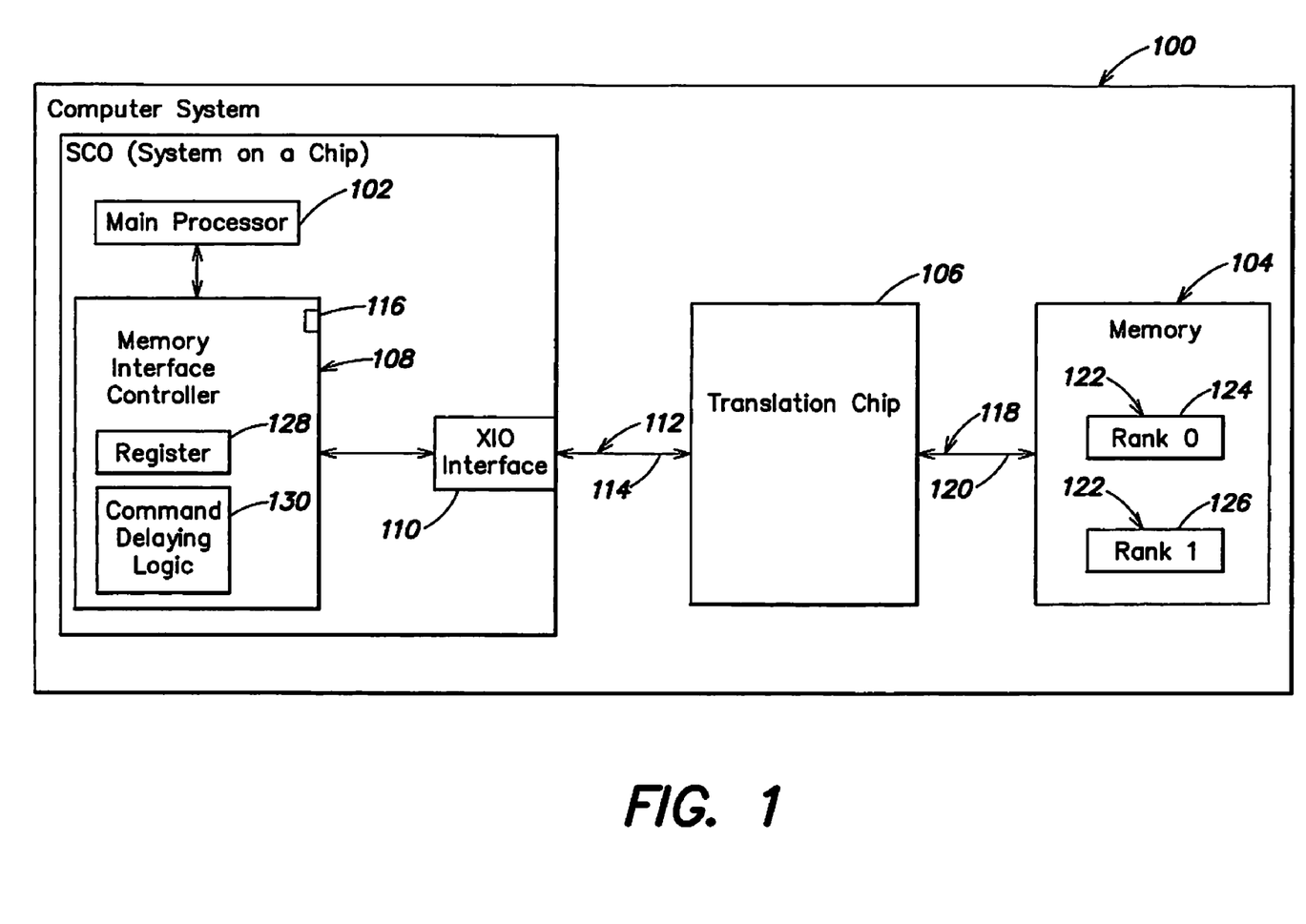
FIG. 1 is a block diagram of a system for interfacing a memory and a processor in accordance with an embodiment of the present invention.

FIG. 1 is a block diagram of a system 100 for interfacing a memory and a processor in accordance with an embodiment of the present invention. With reference to FIG. 1, the system 100 may be a computer or similar device. The system 100 may include a processor 102 coupled to a first memory 104 via a translation chip 106. The processor 102 may be adapted to generate and issue functional commands, such as a read, write and/or the like, to the memory 104. For example, the processor 102 may generate a command of a first type and associate an address with such command. However, the memory 104 may not be accessible by a command and associated address of the first type, but rather by a command and associated address of a second type. Therefore, the translation chip 106 may be adapted to receive a command and associated address of the first type, translate such command and address to a command and associated address of the second type. Further, the translation chip 106 may forward the command and associated address of the second type to the memory 104.

More specifically, the processor 102 may include and/or be coupled to a memory interface controller (MIC) 108 adapted to control the flow of data to and from the memory 104. The MIC 108 may be coupled to a memory interface 110. The memory interface 110 may be included in and/or coupled to the processor 102. The memory interface 110 may be an extreme input/output (XIO) interface. Typically, a processor employs an XIO interface to couple directly to an XDR memory, architected by Rambus, Inc. of Los Altos, Calif. Therefore, the commands and addresses of the first type generated by the processor 102 may be XDR commands and addresses. However, XDR memory is expensive and has less storage capacity than other memories. Further, memory locations provided by an XDR memory may not be divided into groups (e.g., ranks or multiple banks of memory). More specifically, an XDR memory system may not understand the concept of rank for an address range provided by the XDR memory. Therefore, typical XDR commands and addresses do not include information about a rank of memory associated with the command. Including rank information in a memory command and/or an address associated therewith, may enable the command to address twice as many memory locations compared to a command and address associated therewith that does include rank information. Thus, the amount of memory locations that may be addressed by typical XDR commands may be limited. Consequently, the present system 100 may employ a different type of memory 104. For example, the memory 104 may be a double data rate (DDR) memory (e.g., a DDR2 or DDR3 memory), which may be less expensive, have more storage capacity than XDR memory and, in contrast to XDR memory, may include a plurality of ranks. Therefore, the memory 104 may be accessible by a DDR command and an address associated therewith, which may include information about a rank of the memory including the address on which an operation associated with the command is performed.

However, the memory interface 110 may not be adapted to couple directly to the DDR memory 104. For example, the memory interface 110 may be adapted to transmit a command of the first type (e.g., an XDR command) on the first link 112, and as stated above, the memory 104 may only be accessible by a command of the second type (e.g., a DDR command). Therefore, the memory interface 110 may be coupled, via a first link 112, to the translation chip 106, which may translate a command of a first type received from the processor 102 to a command of a different type which may be employed to access the memory 104. The first link 112 may be a narrow, fast link such as an XIO link. An XIO link may provide high bandwidth to memory by enabling eight bits of data to be sent on each of a plurality of lines in the link per clock cycle from the MIC 108 to the translation chip 106. Consequently, the XIO link may be capable of achieving signal rates of at least 3.2 Gbps, which may allow the MIC 108 and/or processor 102 coupled thereto to use fewer I/O, and therefore, save on die size and cost. More specifically, in some embodiments, the first link 112 may include a 72-bit bus 114. However, the bus 114 may be wider or narrower. Further, the first link 112 may include a larger number of and/or different types of buses. The bus 114 may be adapted to transmit read, write, refresh and/or similar commands thereon. Because the first link 112 is fast and narrow, a reduced number of processor pins 116 may be required to couple to the link 112. For example, seventy-two processor pins 116 may be required to couple to the bus 114 (although a larger or smaller number of pins may be required).

Consequently, an overall number of pins 116 included in the processor 102 may be reduced (compared to the number of pins required to couple to a different type of link). Therefore, a size of the processor 102 and cost associated therewith may be reduced.

Thus, the translation chip 106 may couple to a processor 102, which executes an application requiring access to a large amount of memory, via an XIO interface and XIO link. The translation chip 106 may receive XDR command and data protocols and convert such command and data protocols to DDR 2 or DDR 3 command and data protocols. By coupling an XIO link to a DDR memory, the translation logic 106 provides the system 100 with the advantage of using the XIO link (e.g., fewer pins consumed on an expensive processor 102) and the advantage of using DDR memory (e.g., lower cost and higher storage capacity than other memories).

As stated, the translation chip 106 may receive the command and associated address of the first type from the processor 102 via the first link 112 and convert such command and associated address to a command and associated address of the second type. Further, the translation chip 106 may be coupled to the memory 104 via a second link 118. The second link 118 may be a link that is slower than the first, such as a DDR link. However, the second link 118 may be wider than the first link 112 (e.g., so the bandwidth of the second link 118 matches that of the first). For example, the second link 118 may include a 288-bit bus 120. However, the bus 120 may be wider or narrower as long as the second link 118 is wider than the first link 112. Further, the second link 118 may include a larger or smaller number of and/or different types of buses. The bus 120 may be adapted to transmit commands of the second type and an address and/or data associated therewith on the second link 118 for the memory 104. Therefore, the translation chip 106 may be adapted to receive data bits from a 72-bit bus 114 and transmit the data bits on a 288-bit bus 120. In this manner, the system 100 may employ the narrow, fast first link 112 to reduce a size and/or cost associated with the processor 102 coupled thereto. Further, the system 100 may employ an inexpensive memory 104 having a large storage capacity.

As described below, the system 100 may be adapted to modify a typical XDR command generated thereby to an XDR command including rank information. For example, the system 100 may utilize one or more bits of an XDR address to indicate a rank of the memory 104 being accessed. Further, the translation chip 106 may convert such a modified XDR command and address associated therewith to a DDR command and an address associated therewith which includes rank information. For example, assume the memory 104 is a DDR 2 or DDR 3 memory. Memory locations provided by such memory may be divided into groups (e.g., ranks 122). For example, the memory 104 may be divided into a first rank 124, Rank 0, and a second rank 126, Rank 1. However, the memory 104 may include a larger number of ranks 122. The system 100 may include logic 128 such as a register adapted to store one or more bits that indicate whether the system 100 operates in a mode that supports a memory 104 including a plurality of ranks 122, thereby indicating whether the memory 104 includes a plurality of ranks 122. Such logic 128 may be coupled to the processor 102. For example, if the logic 128 stores a first value, the memory 104 includes a plurality of ranks 122 and the system 100 supports such memory 104. Alternatively, if the logic 128 stores a second value, the memory 104 does not include a plurality of ranks 122, and therefore, the system 100 may not support such memory 104. The value stored in the logic 128 may be preconfigured. For example, a predetermined value may be stored in the logic 128 during system configuration.

The processor 102 may be adapted to generate a typical XDR command and address associated therewith, and update (e.g., modify) such XDR command and/or address associated therewith based on the value stored by the logic 128. If the logic 128 stores a value (e.g., a logic "1") indicating the system 100 supports a memory 104 including a plurality of ranks 122, the processor 102 (e.g., MIC 108 included therein) may modify an address associated with the typical XDR command to include one or more bits indicating a rank 122 of memory 104 that includes the address targeted by the command. For example, the processor 102 may update a value stored in bit position 23 of a typical XDR command address such that that value indicates a rank 122 of memory 104 that includes the address. If bit position 23 of the updated address associated with the XDR command is a logic "0", the XDR command targets an address included in a first rank 124 of the memory 104. However, if bit position 23 of the updated address is a logic "1", the XDR command targets an address in a second rank 126 of the memory 104. Although bit position 23 is described above, the processor 102 may update a larger or smaller number of and/or different bit positions of the typical XDR address to form the updated XDR address.

Alternatively, if the logic 128 stores a value (e.g., a logic "0"), indicating the system 100 does not support a memory 104 including a plurality of ranks 122 the processor 102 may update an address associated with the typical XDR command to include one or more bits indicating that the memory 104 does not include a plurality of ranks 122. For example, the processor 102 may update a value stored in bit position 23 to a logic "0" which may indicate the memory 104 does not include a plurality of ranks 122. Although bit position 23 is described above, the processor 102 may update a larger or smaller number of and/or different bit positions of the typical XDR address to form the updated XDR address. Alternatively, in some embodiments, if the logic 128 stores a value indicating the system 100 does not support a memory 104 including a plurality of ranks 122 (e.g., a logic "0"), the processor 102 may not update the address associated with the typical XDR command.

The memory interface 110 may be adapted to transmit the updated XDR command (e.g., XDR command and updated address) to the translation chip 106 via the first link 112. In this manner, the processor 102 may be adapted to issue a command of the first type that includes information about a rank including an address targeted by the command.

The translation chip 106 may be adapted to receive such command and updated address of the first type, and convert such command and updated address to a command and associated address of a second type. If the updated address associated with the command of the first type includes one or more bits indicating a rank 122 targeted by the command of the first type, the command and address of the second type formed by the translation chip 106 may also include one or more bits indicating a rank 122 targeted by the command of the second type. As stated above, the command and address of the second type may be employed to access the memory 104. Exemplary data structures of an address associated with a command of the first and/or second type are described below with reference to FIG. 2.

In a system 100 that includes a memory 104 having a plurality of ranks 122, switching from accessing a first memory rank 124 to accessing a second memory rank 126 requires time. Therefore, when the processor 102 generates a first command requiring access to a first rank 124 of a memory 104, and shortly thereafter, generates a second command requiring access to a second rank 126 of the memory 104, the second XDR command should be delayed to ensure the first memory rank access by the first command completes. The processor 102 is adapted to insert such a delay in the stream of XDR commands output on the first link 112 via the memory interface 110. For example, the processor 102 may include command delaying logic 130 that may delay issue on the first link 112 of a second XDR command requiring access to a second rank 126 of the memory 104 if a first command requiring access to a different memory rank 124 (e.g., a first rank 124) was recently issued on the link 112. In this manner, the system 100 may ensure memory accesses associated with the first and second commands complete successfully.

Figure 2:
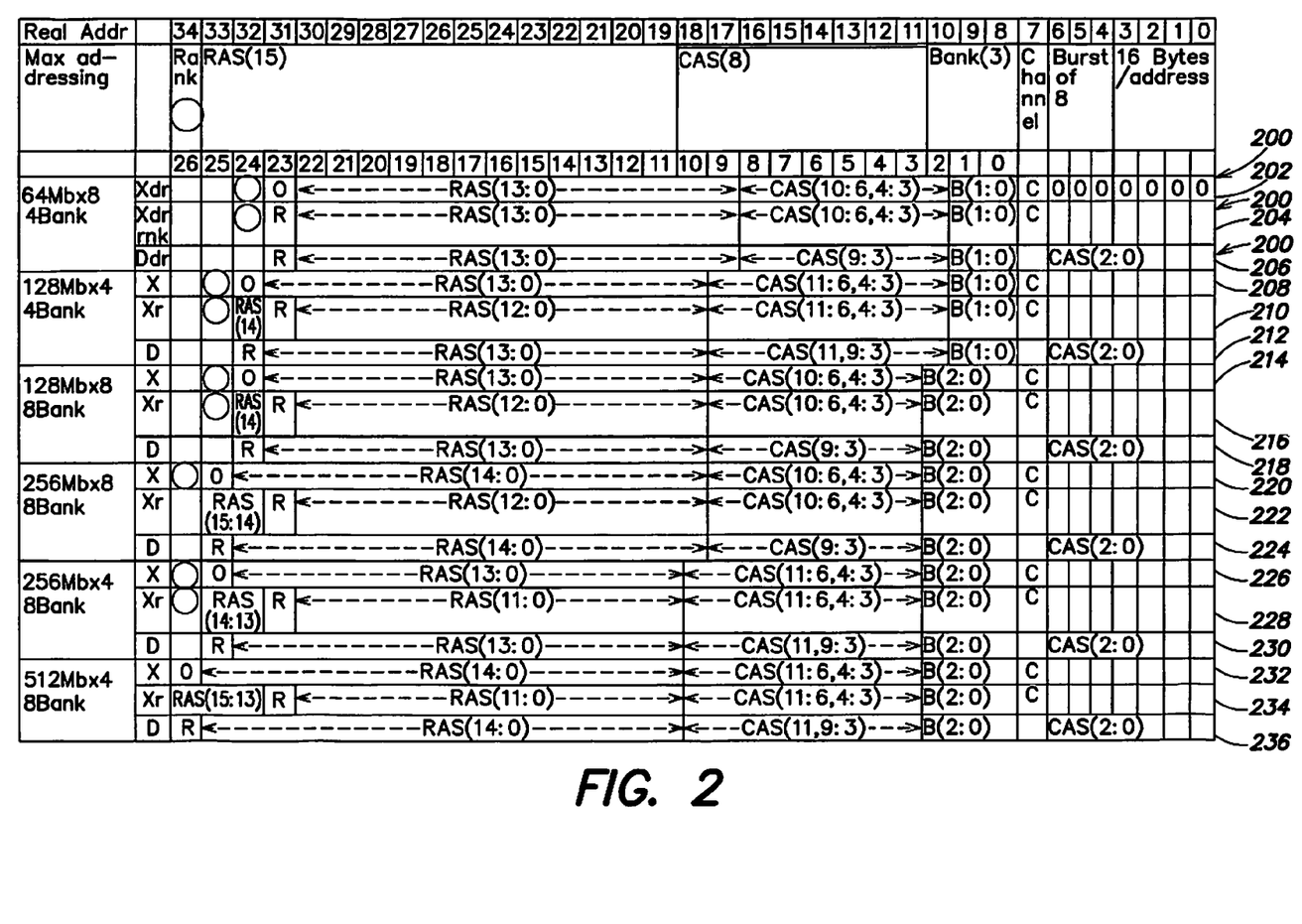
FIG. 2 illustrates data structures of addresses associated with different types of commands, respectively, that may be issued by the system of FIG. 1 in accordance with an embodiment of the present invention.

FIG. 2 illustrates data structures 200 of addresses associated with different types of commands, respectively, that may be issued by the system 100 of FIG. 1 in accordance with an embodiment of the present invention. With reference to FIG. 2, data structures 200 of command addresses employed to access the memories 104 of different sizes are illustrated. Each address employed by the system 100 to access memory may be translated to a real memory address which may include thirty-five bits (0:34) (although the real memory address may be larger or smaller). For example, up to four bits of the real address may indicate a specific location of the memory being addresses, up to three bits of the real address may indicate a burst of 8. Each memory access is 16 bytes wide (16 bytes address, bits 3-0). A dram can drive the bus for 8 cycles from a single command (burst of 8, bits 6-4) thus a single command can access 128B of data (bits 6-0) and so the low order 7 bits are not used in the dram command (also bits 6-0). One bit of the real address may indicate a channel 'C' employed to access the memory 104, up to three bits may indicate a bank 'B' of the memory 104 being accessed, up to eight bits of the real address may serve as 'column address select' (CAS) bits which indicate a column of the memory being accessed, up to fifteen bits of the real address may serve as 'row address select' (RAS) bits which indicate a row of the memory being accessed and a bit of the real address may serve as a rank bit R. However, such real address is exemplary, and therefore, the real address may include a larger or smaller number of fields and/or different fields. Further, a different number of bits may be employed to indicate the specific location of memory being addressed, burst of 8, channel, bank, CAS, RAS and rank bit. For example, bits 0-3 of the real address may indicate a specific location of the memory 104 being addressed. Bits 4-6 may indicate the burst of 8. Bit 7 of the real address may indicate the channel C employed to access the memory 104. Bits 8-10 may indicate a bank of the memory 104 being accessed. Bits 11-18 may serve as CAS bits and bits 19-33 may serve as RAS bits and Bit 34 may serve as a rank bit. Although one or more different bit positions may be employed store the specific location of memory being addressed, burst of 8, channel, bank, CAS, RAS and/or rank bit.

The system 100 may generate and employ an XDR command address 202 to access a 64 Mb×8 memory (e.g., DIMM) having four banks and which does not include a plurality of ranks. Such address may include twenty-seven bits (0:26). Bits 0-1 of the address 202 may serve as one or more portions of bits employed to indicate a bank of the memory 104 being accessed. Bits 2-8 may serve as one or more portions of Column Address Select (CAS) bits which indicate a column of the memory 104 being accessed. Bits 9-22 may serve as one or more portions of Row Address Select (RAS) bits which indicate a row of the memory 104 being accessed. Further, the XDR command of the present invention may employ one or more bit positions, which are employed by a typical XDR command to store bank, CAS, or RAS bits, to store data indicating the memory 104 does not include a plurality of ranks 122. Bit 23 of such address may serve to indicate that the memory 104 does not include a plurality of ranks 122 (although another bit position may be employed). For example, the processor 102 may update the value stored in such bit position to a logic "0" if the logic 128 stores a value indicating the memory does not include a plurality of ranks 122. Remaining bits of such XDR address which does not select a memory rank may be reserved or unused.

Alternatively, the system 100 may generate and employ an XDR command address with rank selection 204 to access the 64 Mb×8 memory having four banks and which includes a plurality of ranks. For example, the XDR command address with rank selection may include twenty-seven bits (0:26). Bits 0-1 of the address may serve as one or more portions of bits employed to indicate a bank of the memory 104 being accessed. Bits 2-8 may serve as one or more portions of Column Address Select (CAS) bits which indicate a column of the memory 104 being accessed. Bits 9-22 may serve as one or more portions of Row Address Select (RAS) bits which indicate a row of the memory 104 being accessed. Bit position 24 may serve as a rank bit R which indicates which rank to select. Further, the XDR command with rank selection of the present invention may employ one or more bit positions, which are employed by a typical XDR command to store bank, CAS, RAS or rank bits, to store data indicating a rank 122 of the memory 104 including the address to be accessed. Bit 23 of such address may serve to indicate the rank 122 of memory 104 including the address being accessed (although another bit position may be employed). For example, bit 23 of such address may serve to indicate that the memory 104 does not include a plurality of ranks 122. Alternatively, the processor 102 may update the value stored in such bit position to a first value (e.g., a logic "0") if the logic 128 stores a value indicating the memory includes a plurality of ranks 122 and the first memory rank 124 is to be accessed. Further, the processor 102 may update the value stored in such bit position to a second value (e.g., a logic "1") if the logic 128 stores a value indicating the memory includes a plurality of ranks 122 and the second memory rank 126 is to be accessed. Remaining bits of such XDR address which does not select a memory rank may be reserved or unused.

As stated above, the translation chip 106 may convert an XDR command address to a DDR command address. For example, the translation chip 106 may convert an XDR command address 202 to access a 64 Mb×8 memory having four banks and which does not include a plurality of ranks to a DDR address. The resulting DDR address may be similar to or the same as the XDR address. Therefore, such DDR address is not described in detail herein.

Alternatively, the translation chip 106 may convert an XDR command address with rank selection 204 to access the 64 Mb×8 memory having four banks to a DDR address 206 including a rank 122 selection. The resulting DDR address with rank selection may include twenty-seven bits (0:26). Bits 0-1 of the address may serve as the one or more portions of bits employed to indicate a bank of the memory 104 being accessed. Bits 2-8 may serve as a different portion of the CAS bits which indicate a column of the memory 104 being accessed. Bits 9-22 may serve as the one or more portions of RAS bits which indicate a row of the memory 104 being accessed. Further, one or more bit positions of the DDR command with rank selection, which are employed by a typical DDR command to store bank, CAS or RAS bits, may be employed to store the data indicating a rank 122 of the memory 104 including the address to be accessed. For example, bit 23 of such address may serve to indicate the rank 122 of memory 104 including the address being accessed (although another bit position may be employed). Remaining bits of such DDR address 206 including rank selection may be reserved or unused. Thus, for a 64 Mb×8 DIMM with 4 banks, if the rank mode bit, which is stored in the logic 128, is off (e.g., a logic "0"), then bit 31 of the real address may be a logic "0" for the corresponding DDR address 206. Alternatively, if the rank mode bit is on (e.g., a logic "1"), then Real Address bit 31 corresponding to the XDR address would be either a logic "0" or a logic "1" depending on which rank of the memory 104 (e.g., DIMM included therein) is to be selected. The DDR address 206 corresponding thereto would also select such rank.

As stated, one or more of the above-described command addresses may be translated into a real memory address. For example, bits 0-26 of one of the above-described command addresses may be mapped to bits 8-34 of a real command address. Thus, the rank bit (e.g., bit 23) for an XDR or DDR command with rank selection may be mapped to bit 31 of the real address. Further, when an XDR command address to a memory 104 that does not include a plurality of ranks 122 and an XDR command address to a memory 104 that includes a plurality of ranks 122 is converted to a real address, bits 0-3 of the real address may indicate a specific location of the memory 104 being addressed. Bits 4-6 may indicate the burst of 8. Bit 7 of the real address may indicate the channel C employed to access the memory 104. In contrast, when a DDR command address including rank selection is converted to a real address, bits 0-3 of the real address may indicate a specific location of the memory 104 being addressed, bits 4-6 may serve as a portion of the CAS bits, and bit 7 of the real address may indicate the channel C employed to access the memory 104.

XDR and DDR command addresses employed by the system 100 to access memory 104 of different sizes may be similar to the command addresses described above and such command addresses may be mapped to real command address as described above. For example, the system 100 may generate and employ an XDR command address 208 to access a 128 Mb×4 memory having four banks and which does not include a plurality of ranks. Such address may include twenty-seven bits (0:26). Bits 0-1 of the address may serve as one or more portions of bits employed to indicate a bank of the memory 104 being accessed. Bits 2-9 may serve as one or more portions of CAS bits which indicate a column of the memory 104 being accessed. Bits 10-23 may serve as one or more portions of RAS bits which indicate a row of the memory 104 being accessed. Bit 24 of such address may serve to indicate that the memory 104 does not include a plurality of ranks 122 (although another bit position may be employed). Remaining bits of such XDR address, which does not select a memory rank, may be reserved or unused.

Alternatively, the system 100 may generate and employ an XDR command address with rank selection 210 to access the 128 Mb×4 memory having four banks and which includes a plurality of ranks. For example, the XDR command address with rank selection may include twenty-seven bits (0:26). Bits 0-1 of the address may serve as one or more portions of bits employed to indicate a bank of the memory 104 being accessed. Bits 2-9 may serve as one or more portions of CAS bits which indicate a column of the memory 104 being accessed. Bits 10-22 may serve as a first portion of RAS bits which indicate a row of the memory 104 being accessed. Bit 23 of such address may serve to indicate the rank 122 of memory 104 including the address being accessed (although another bit position may be employed). Bit position 24 may serve as a remaining portion the RAS bits and bit 25 may serve as a rank bit R. Remaining bits of such XDR address 210 may be reserved or unused.

The translation chip 106 may convert an XDR command address with rank selection 210 to access the 128 Mb×4 memory having four banks to a DDR address 212 including a rank selection. The resulting DDR address 212 with rank selection may include twenty-seven bits (0:26). Bits 0-1 of the address may serve as one or more portions of bits employed to indicate a bank of the memory 104 being accessed. Bits 2-9 may serve as a different portion of the CAS bits which indicate a column of the memory 104 being accessed. Bits 10-23 may serve as one or more portions of RAS bits which indicate a row of the memory 104 being accessed. Bit 24 of such address may serve to indicate the rank 122 of memory 104 including the address being accessed (although another bit position may be employed). Remaining bits of such DDR address including rank selection 212 may be reserved or unused.

Similarly, the system 100 may generate and employ an XDR command address 214 to access a 128 Mb×8 memory having eight banks and which does not include a plurality of ranks. Such address may include twenty-seven bits (0:26). Bits 0-2 of the address may serve as one or more portions of bits employed to indicate a bank of the memory 104 being accessed. Bits 3-9 may serve as one or more portions of CAS bits which indicate a column of the memory 104 being accessed. Bits 10-23 may serve as one or more portions of RAS bits which indicate a row of the memory 104 being accessed. Bit 24 of such address may serve to indicate that the memory 104 does not include a plurality of ranks 122 (although another bit position may be employed). Remaining bits of such XDR address, which does not select a memory rank, may be reserved or unused.

Alternatively, the system 100 may generate and employ an XDR command address with rank selection 216 to access the 128 Mb×8 memory having eight banks and which includes a plurality of ranks. For example, the XDR command address with rank selection may include twenty-seven bits (0:26). Bits 0-2 of the address may serve as one or more portions of bits employed to indicate a bank of the memory 104 being accessed. Bits 3-9 may serve as one or more portions of CAS bits which indicate a column of the memory 104 being accessed. Bits 10-22 may serve as a first portion of RAS bits which indicate a row of the memory 104 being accessed. Bit 23 of such address may serve to indicate the rank 122 of memory 104 including the address being accessed (although another bit position may be employed). Bit position 24 may serve as a remaining portion the RAS bits and bit 25 may serve as a rank bit R. Remaining bits of such XDR address 216 may be reserved or unused.

The translation chip 106 may convert an XDR command address with rank selection 216 to access the 128 Mb×8 memory having eight banks to a DDR address 218 including a rank selection. The resulting DDR address with rank selection 218 may include twenty-seven bits (0:26). Bits 0-2 of the address may serve as the one or more portions of bits employed to indicate a bank of the memory 104 being accessed. Bits 3-9 may serve as a different portion of the CAS bits which indicate a column of the memory 104 being accessed. Bits 10-23 may serve as one or more portions of RAS bits which indicate a row of the memory 104 being accessed. Bit 24 of such address may serve to indicate the rank 122 of memory 104 including the address being accessed (although another bit position may be employed). Remaining bits of such DDR address including rank selection 224 may be reserved or unused.

Similarly, the system 100 may generate and employ an XDR command address 220 to access a 256 Mb×8 memory having eight banks and which does not include a plurality of ranks. Such address may include twenty-seven bits (0:26). Bits 0-2 of the address may serve as one or more portions of bits employed to indicate a bank of the memory 104 being accessed. Bits 3-9 may serve as one or more portions of CAS bits which indicate a column of the memory 104 being accessed. Bits 10-24 may serve as one or more portions of RAS bits which indicate a row of the memory 104 being accessed. Bit 25 of such address may serve to indicate that the memory 104 does not include a plurality of ranks 122 (although another bit position may be employed). Remaining bits of such XDR address, which does not select a memory rank, may be reserved or unused.

Alternatively, the system 100 may generate and employ an XDR command address with rank selection 222 to access the 256 Mb×8 memory having eight banks and which includes a plurality of ranks. For example, the XDR command address with rank selection 222 may include twenty-seven bits (0:26). Bits 0-2 of the address may serve as one or more portions of bits employed to indicate a bank of the memory 104 being accessed. Bits 3-9 may serve as one or more portions of CAS bits which indicate a column of the memory 104 being accessed. Bits 10-22 may serve as a first portion of RAS bits which indicate a row of the memory 104 being accessed. Bit 23 of such address may serve to indicate the rank 122 of memory 104 including the address being accessed (although another bit position may be employed). Bits 24-25 may serve as a remaining portion the RAS bits. Remaining bits of such XDR address 222 may be reserved or unused.

The translation chip 106 may convert an XDR command address with rank selection 222 to access the 256 Mb×8 memory having eight banks to a DDR address including a rank selection 224. The resulting DDR address with rank selection 224 may include twenty-seven bits (0:26). Bits 0-2 of the address may serve as the one or more portions of bits employed to indicate a bank of the memory 104 being accessed. Bits 3-9 may serve as a different portion of the CAS bits which indicate a column of the memory 104 being accessed. Bits 10-24 may serve as one or more portions of RAS bits which indicate a row of the memory 104 being accessed. Bit 25 of such address may serve to indicate the rank 122 of memory 104 including the address being accessed (although another bit position may be employed). Remaining bits of such DDR address including rank selection 224 may be reserved or unused.

Similarly, the system 100 may generate and employ an XDR command address 226 to access a 256 Mb×4 memory having eight banks and which does not include a plurality of ranks. Such address may include twenty-seven bits (0:26). Bits 0-2 of the address may serve as one or more portions of bits employed to indicate a bank of the memory 104 being accessed. Bits 3-10 may serve as one or more portions of CAS bits which indicate a column of the memory 104 being accessed. Bits 11-24 may serve as one or more portions of RAS bits which indicate a row of the memory 104 being accessed. Bit 25 of such address may serve to indicate that the memory 104 does not include a plurality of ranks 122 (although another bit position may be employed).

Alternatively, the system 100 may generate and employ an XDR command address with rank selection 228 to access the 256 Mb×4 memory having eight banks and which includes a plurality of ranks. For example, the XDR command address with rank selection 228 may include twenty-seven bits (0:26). Bits 0-2 of the address may serve as one or more portions of bits employed to indicate a bank of the memory 104 being accessed. Bits 3-10 may serve as one or more portions of CAS bits which indicate a column of the memory 104 being accessed. Bits 11-22 may serve as a first portion of RAS bits which indicate a row of the memory 104 being accessed. Bit 23 of such address may serve to indicate the rank 122 of memory 104 including the address being accessed (although another bit position may be employed). Bits 24-25 may serve as a remaining portion of the RAS bits.

The translation chip 106 may convert an XDR command address with rank selection 228 to access the 256 Mb×4 memory having eight banks to a DDR address including a rank selection 230. The resulting DDR address with rank selection 230 may include twenty-seven bits (0:26). Bits 0-2 of the address may serve as the one or more portions of bits employed to indicate a bank of the memory 104 being accessed. Bits 3-10 may serve as a different portion of the CAS bits which indicate a column of the memory 104 being accessed. Bits 11-24 may serve as one or more portions of RAS bits which indicate a row of the memory 104 being accessed. Bit 25 of such address may serve to indicate the rank 122 of memory 104 including the address being accessed (although another bit position may be employed). Remaining bits of such DDR address 230 including rank selection may be reserved or unused.

Similarly, the system 100 may generate and employ an XDR command address 232 to access a 512 Mb×4 memory having eight banks and which does not include a plurality of ranks. Such address may include twenty-seven bits (0:26). Bits 0-2 of the address may serve as one or more portions of bits employed to indicate a bank of the memory 104 being accessed. Bits 3-10 may serve as one or more portions of CAS bits which indicate a column of the memory 104 being accessed. Bits 11-25 may serve as one or more portions of RAS bits which indicate a row of the memory 104 being accessed.

Alternatively, the system 100 may generate and employ an XDR command address with rank selection 234 to access the 512 Mb×4 memory having eight banks and which includes a plurality of ranks. For example, the XDR command address with rank selection 234 may include twenty-seven bits (0:26). Bits 0-2 of the address may serve as one or more portions of bits employed to indicate a bank of the memory 104 being accessed. Bits 3-10 may serve as one or more portions of CAS bits which indicate a column of the memory 104 being accessed. Bits 11-22 may serve as a first portion of RAS bits which indicate a row of the memory 104 being accessed. Bit 23 of such address may serve to indicate the rank 122 of memory 104 including the address being accessed (although another bit position may be employed). Bits 24-26 may serve as a remaining portion of the RAS bits.

The translation chip 106 may convert an XDR command address with rank selection 234 to access the 512 Mb×4 memory having eight banks to a DDR address including a rank selection 236. The resulting DDR address with rank selection 236 may include twenty-seven bits (0:26). Bits 0-2 of the address may serve as the one or more portions of bits employed to indicate a bank of the memory 104 being accessed. Bits 3-10 may serve as a different portion of the CAS bits which indicate a column of the memory 104 being accessed. Bits 11-25 may serve as one or more portions of RAS bits which indicate a row of the memory 104 being accessed. Bit 26 of such address may serve to indicate the rank 122 of memory 104 including the address being accessed (although another bit position may be employed).

The memory sizes and configurations described above are exemplary, and therefore, a larger or smaller memory size and/or different memory configuration may be employed. As illustrated in FIG. 2, for any size of memory 104, bit 23 of an XDR command address with rank selection and bit 31 of a corresponding real address may serve as the rank bit (assuming rank mode is enabled). When such XDR command address with rank selection is converted to a DDR command address, the rank bit R may be the next bit more significant than the largest of the RAS bits. Consequently, the position of the rank bit R in the real address corresponding to the DDR address may vary based on the memory size and/or configuration. Thus, the present methods and apparatus employ a predictable scheme for addresses generated by the XDR address generator (e.g., MIC 108). If a mode of operation is selected (e.g., by storing a predetermined value in logic 128 such as a register), one or more bits in the typical XDR command and/or address stream may be updated to select a rank of memory. Further, such rank bit of the XDR command may be remapped to a rank bit of a DDR address.

Figure 3:
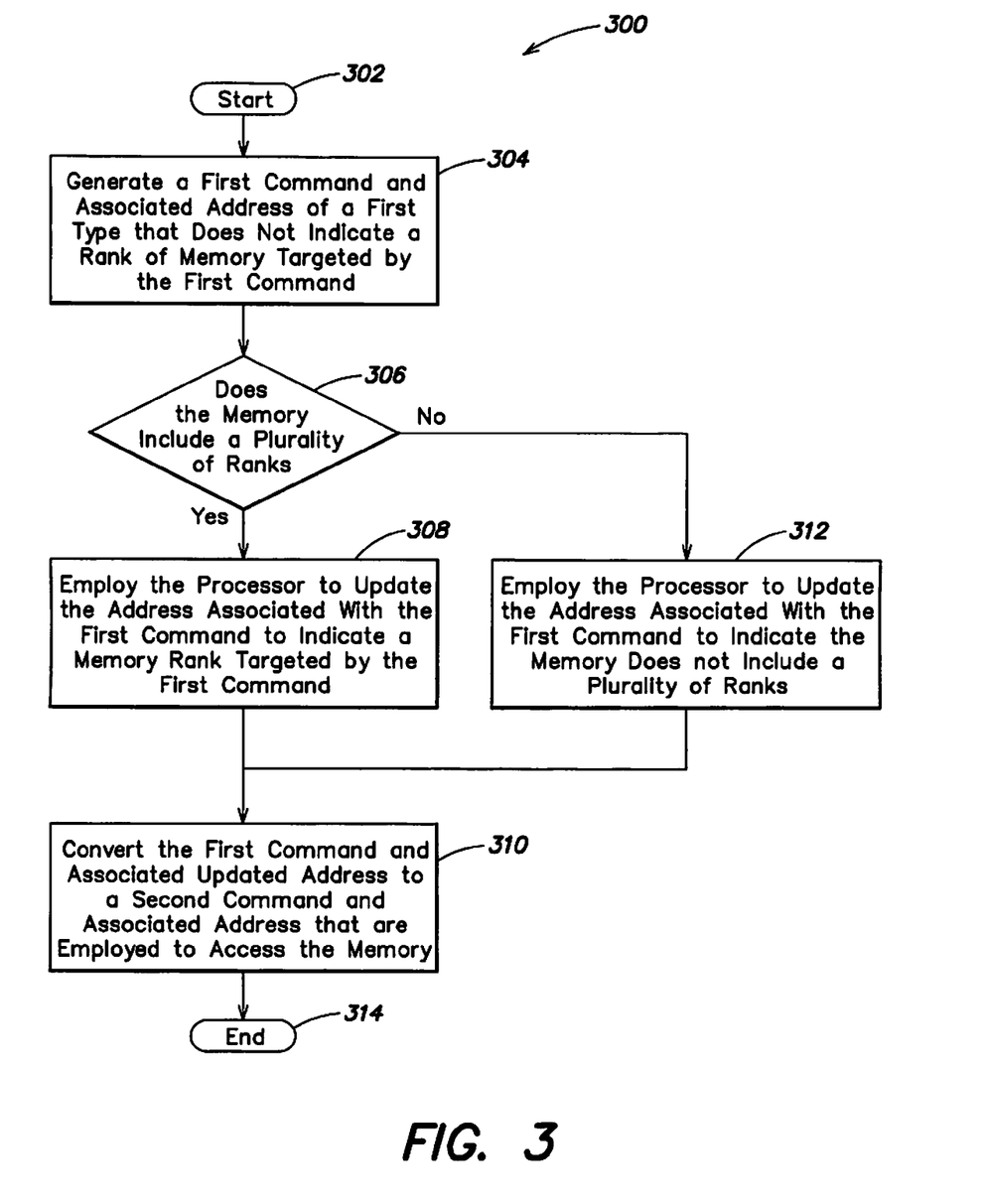
FIG. 3 illustrates a method for interfacing a memory and a processor in accordance with an embodiment of the present invention.

Operation of the system 100 is now described with reference to FIG. 3 which illustrates a method for interfacing a memory 104 and a processor 102 in accordance with an embodiment of the present invention. With reference to FIG. 3, in step 302, the method begins. In step 304, a first command and associated address of a first type that does not indicate a rank of memory targeted by the first command may be generated. For example, the MIC 108 of the processor 102 may create a typical XDR memory command to be transmitted on the first link 112 via the XIO interface 110.

In step 306, the system 100 determines whether the memory 104 includes a plurality of ranks 122. For example, the MIC 108 may determine whether memory 104 of the system 100 includes a plurality of ranks 122 based on a value stored by logic (e.g., a register) 128 of the system 100. If the logic 128 stores a first value, such as a logic "0", the memory 104 does not include a plurality of ranks 122. Alternatively, if the logic 128 stores a second value, such as a logic "1", the memory 104 may include a plurality of ranks 122. The value stored in the logic 128 may be preconfigured. For example, such value may be stored in the logic during system initialization or similar process. As described below, the value stored by the logic 128 may indicate an operational mode of the system 100. For example, if the logic 128 stores the first value, the system 100 operates in a first mode that does not support a memory 104 including a plurality of ranks 122. Alternatively, if the logic 128 stores the second value, the system 100 operates in a second mode that supports a memory 104 including a plurality of ranks 122.

If the system 100 determines in step 306 that the memory 104 includes a plurality of ranks 122, step 308 may be performed. In step 308, the processor may be employed to update the address associated with the first command to indicate a memory rank 122 targeted by the first command. More specifically, the MIC 108 may update one or more portions of the first command and/or an address associated therewith. For example, the MIC 108 may update bit 23 of the typical XDR command address generated thereby to include a first logic value if the XDR command targets a first memory rank 124. Alternatively, the MIC 108 may update such bit of the typical XDR command address generated thereby to include a second logic value if the XDR command targets a second memory rank 126. The XDR command along with the updated address 204, 210, 216, 222, 228, 234 associated therewith may serve as an XDR memory command including rank selection. Thereafter, step 310, which is described below, may be performed.

Alternatively, if the system 100 determines in step 306 that the memory 104 does not include a plurality of ranks 122, step 312 may be performed. In step 312, the processor may be employed to update the address associated with the first command to indicate a memory rank 122 targeted by the first command. More specifically, the MIC 108 may update one or more portions of the first command and/or an address associated therewith. For example, the MIC 108 may update bit 23 of the predetermined logic value (e.g., a logic "0") that indicates the memory 104 does not include a plurality of ranks 122 when the logic 128 stores the first value. In this manner, the XDR command along with the updated address associated 202, 208, 214, 220, 226, 232 therewith may serve as an XDR command that does not include a rank selection. Thereafter, step 310 may be performed.

In step 310, the first command and associated updated address 202, 208, 214, 220, 226, 232, 204, 210, 216, 222, 228, 234 may be converted to a second command and associated address 206, 212, 218, 224, 230, 236 that may be employed to access the memory. For example, if the memory 104 includes a plurality of ranks 122, the MIC 108 may transmit the XDR command and updated address 204, 210, 216, 222, 228, 234 associated therewith (e.g., an XDR command including rank selection) on the first link 112 via the memory interface 110. The translation chip 106 may receive such command and associated updated address 204, 210, 216, 222, 228, 234 via the first link 112, and convert such command and associated updated address 204, 210, 216, 222, 228, 234 to a DDR command and associated address 206, 212, 218, 224, 230, 236 that includes a rank selection. In this manner, the system 100 may form a DDR command including rank selection. The system 100 may employ the DDR command including rank selection to access the memory 104 by transmitting such DDR command on the second link 118.

Alternatively, if the memory 104 does not include a plurality of ranks 122, the MIC 108 may transmit the XDR command and updated address 202, 208, 214, 220, 226, 232 associated therewith (e.g., an XDR command that does not include rank selection) on the first link 112 via the memory interface 110. The translation chip 106 may receive such command and associated updated address 202, 208, 214, 220, 226, 232 via the first link 112, and convert such command and associated updated address to a DDR command and associated address that does not include a rank selection. The system 100 may employ the DDR command that does not include a rank selection to access the memory 104 by transmitting such DDR command on the second link 118.

One or more of the above described steps may be repeated such that the processor 102 may issue a first XDR command requiring access to a first memory rank 124 on the first link 112, and shortly thereafter, the processor 102 may generate a second XDR command that requires access to a second memory rank 126. Switching from accessing a first memory rank 124 to accessing a second memory rank 126 requires time. Therefore, the system 100 may employ the command delaying logic 130 to delay the second command to ensure the first memory rank access by the first command may complete successfully.

Thereafter, step 314 may be performed. In step 314, the method 300 ends. Through use of the present method 300, a processor 102 of the system 100 may employ a MIC 108, memory interface 110 and first link 112 adapted to generate and transmit a command of the first type (e.g., an XDR command) to perform an operation on memory 104 accessible by a command of the second type (e.g., a DDR command). Thus, the system 100 may benefit from the advantages of using an XIO link and a DDR memory. Further, the memory 104 may include a plurality of ranks 122. The present method may employ a mode bit to designate between an XDR address without a rank bit and an XDR address with a rank bit.

Each XDR address may be translated to a corresponding DDR address. When the mode bit is set to utilize a rank selection, a specific bit from the XDR address may be used to specify one of a plurality of ranks. For example, if the bit is a logic "0", rank 0 may be selected in the DDR address. Alternatively, if the bit is a logic "1", rank 1 may be selected in the DDR address. The system 100 may benefit from the advantage of increased command addressing by including rank information in a command and/or address associated therewith. For example, the addition of a rank selection in a command address may allow more (e.g., twice as much) memory to be addressed based on a configuration of the memory 104 (e.g., of DIMMs included therein).

The foregoing description discloses only exemplary embodiments of the invention. Modifications of the above disclosed apparatus and methods which fall within the scope of the invention will be readily apparent to those of ordinary skill in the art. For instance, although command delaying logic 130 is described above, in some embodiments, the system 100 may not include such logic 130.

Accordingly, while the present invention has been disclosed in connection with exemplary embodiments thereof, it should be understood that other embodiments may fall within the spirit and scope of the invention, as defined by the following claims.

The invention claimed is:

1. A method of interfacing a processor and memory of a system, comprising:

generating a first command and associated address of a first type that does not indicate a rank of memory targeted by the first command;

determining whether the memory includes a plurality of ranks;

if the memory includes a plurality of ranks, employing the processor to update the address associated with the first command to indicate a memory rank targeted by the first command;

wherein employing the processor to update the address associated with the first command includes adapting the processor to update a value stored in a predetermined bit position to indicate a memory rank targeted by the first command;

if the memory does not include a plurality of ranks, employing a memory interface controller (mic) to update the address associated with the first command to indicate the memory does not include a plurality of ranks; and converting the first command and associated updated address to a second command and associated address that are employed to access the memory.

2. The method of claim 1 wherein determining whether the memory includes a plurality of ranks includes determining whether the memory includes a plurality of ranks based on a value stored by logic of the system.

3. The method of claim 1 wherein:

the first command of the first type is an extreme data rate command; and the second command of the second type is a double data rate command.

4. The method of claim 1 wherein:

converting the first command and associated updated address to a second command and associated address that are employed to access the memory includes converting the updated address associated with the first command to an address associated with the second command that includes a value stored in a predetermined bit position thereof indicating a memory rank targeted by the second command; and the predetermined bit position of the address associated with the first command may be different than the predetermined bit position of the address associated with the second command.

5. The method of claim 1 wherein employing the processor to update the address associated with the first command to indicate the memory does not include a plurality of ranks includes employing the processor to store a bit of a predetermined value in a predetermined bit position of the address.

6. The method of claim 1 further comprising:
generating a third command and associated address of the first type that does not indicate a rank of memory targeted by the first command;
if the memory includes a plurality of ranks, employing the processor to update the address associated with the third command to indicate a memory rank targeted by the third command; and
if the third command targets a different memory rank than the first command, delaying the third command to ensure the first command completes.

7. An apparatus for interfacing a processor and memory of a computer system, comprising:
a processor adapted to generate a first command and an associated address of a first type that does not indicate a memory rank targeted by the first command;
wherein the processor is further adapted to update a value stored in a predetermined bit position of an address associated with the first command to indicate a memory rank targeted by the first command; and
a translation chip adapted to couple to the processor and a memory accessible by a second command and an associated address of a second type;
wherein the apparatus is adapted to:
employ the processor to:
generate the first command and associated address of the first type that does not indicate a rank of memory targeted by the first command;
determine whether the memory includes a plurality of ranks;
if the memory includes a plurality of ranks, update the address associated with the first command to indicate a memory rank targeted by the first command; and
if the memory does not include a plurality of ranks, update the address associated with the first command to indicate the memory does not include a plurality of ranks; and
employ the translation chip to convert the first command and associated updated address to a second command and an associated address that are employed to access the memory.

8. The apparatus of claim 7 further comprising logic coupled to the processor;
wherein the processor is further adapted to determine whether the memory includes a plurality of ranks based on a value stored by the logic.

9. The apparatus of claim 7 wherein:
the first command of the first type is an extreme data rate command; and
the second command of the second type is a double data rate command.

10. The apparatus of claim 7 wherein:
the translation chip is further adapted to convert the updated address associated with the first command to an address associated with the second command that includes a value stored in a predetermined bit position thereof indicating a memory rank targeted by the second command; and the predetermined bit position of the updated address associated with the first command may be different than the predetermined bit position of the address associated with the second command.

11. The apparatus of claim 7 wherein the processor is further adapted to store a bit of a predetermined value in a predetermined bit position of the address associated with the first command to form the updated address.

12. The apparatus of claim 7 further comprising command delaying logic coupled to the processor;
wherein the processor is further adapted to:
generate a third command and associated address of the first type that does not indicate a rank of memory targeted by the first command;
if the memory includes a plurality of ranks, update the address associated with the third command to indicate a memory rank targeted by the third command; and
if the third command targets a different memory rank than the first command, employ the command delaying logic to delay the third command to ensure the first command completes.

13. A system for interfacing a processor and a memory, comprising:
a processor adapted to generate a first command and an associated address of a first type that does not indicate a memory rank targeted by the first command;
wherein the processor is further adapted to update a value stored in a predetermined bit position of an address associated with the first command to indicate a memory rank targeted by the first command;
a memory accessible by a second command and an associated address of a second type; and
a translation chip adapted to couple to the processor and the memory;
wherein the system is adapted to:
employ the processor to:
generate the first command and associated address of the first type that does not indicate a rank of memory targeted by the first command;
determine whether the memory includes a plurality of ranks;
if the memory includes a plurality of ranks, update the address associated with the first command to indicate a memory rank targeted by the first command; and
if the memory does not include a plurality of ranks, update the address associated with the first command to indicate the memory does not include a plurality of ranks; and
employ the translation chip to convert the first command and associated updated address to a second command and associated address that are employed to access the memory.

14. The system of claim 13 further comprising logic coupled to the processor;
wherein the processor is further adapted to determine whether the memory includes a plurality of ranks based on a value stored by the logic.

15. The system of claim 13 wherein:
the first command of the first type is an extreme data rate (XDR) command; and
the second command of the second type is a double data rate (DDR) command.

16. The system of claim 13 wherein:
the translation chip is further adapted to convert the updated address associated with the first command to an address associated with the second command that includes a value stored in a predetermined bit position thereof indicating a memory rank targeted by the second command; and
the predetermined bit position of the updated address associated with the first command may be different than the predetermined bit position of the address associated with the second command.

17. The system of claim 13 wherein the processor is further adapted to store a bit of a predetermined value in a predetermined bit position of the address associated with the first command to form the updated address.

18. The system of claim 13 further comprising command delaying logic coupled to the processor;
wherein the processor is further adapted to:
generate a third command and associated address of the first type that does not indicate a rank of memory targeted by the first command;
if the memory includes a plurality of ranks, update the address associated with the third command to indicate a memory rank targeted by the third command; and
if the third command targets a different memory rank than the first command, employ the command delaying logic to delay the third command to ensure the first command completes.

* * * * *